Figure 1:
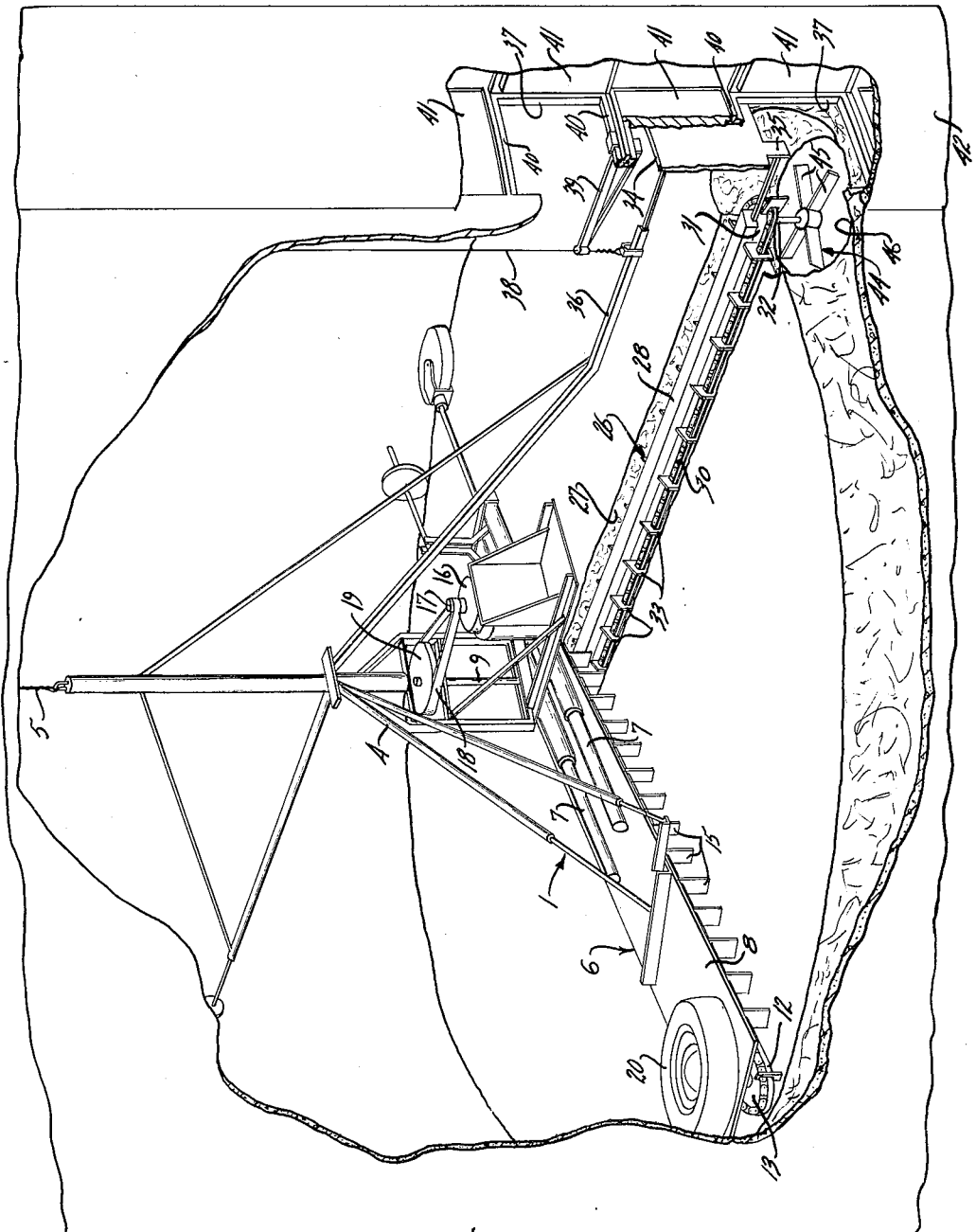

Jan. 25, 1966    G. B. BRUECKER    3,231,106
SILO UNLOADER

Filed April 6, 1964    2 Sheets-Sheet 1

INVENTOR.
GEORGE B. BRUECKER
BY
Andrus & Starke
Attorneys

Jan. 25, 1966  G. B. BRUECKER  3,231,106
SILO UNLOADER

Filed April 6, 1964  2 Sheets-Sheet 2

INVENTOR.
GEORGE B. BRUECKER
BY
Andrus & Starke
Attorneys

United States Patent Office 3,231,106
Patented Jan. 25, 1966

3,231,106
SILO UNLOADER
George B. Bruecker, Kaukauna, Wis., assignor, by mesne assignments, to Badger Northland, Inc., Kaukauna, Wis., a corporation of Wisconsin
Filed Apr. 6, 1964, Ser. No. 357,556
4 Claims. (Cl. 214—17)

This invention relates to an apparatus for removing stored material from a storage structure and more particularly to a silo unloader.

The conventional silo for storing silage or other food materials is provided with a series of spaced, vertical openings which extend the height of the silo and are separated by horizontal frames or structural members. The openings are closed off by removable doors when the silo is filled, and as the silage is removed from the upper surface of the silage bed, the doors above the level of the silage are removed so that the silage can be discharged through the openings in the silo wall to the exterior.

The silo unloader used to remove the silage includes a frame which carries a rotating cutter arm journalled in the frame at the center of the silo. The cutter arm rotates within the silo to dislodge the silage and move the dislodged silage to the center of the silo. In some types of unloaders, the dislodged silage is elevated at the center of the silo and discharged to the exterior, while in other types of unloaders, as shown in the patent to Skromme 3,045,841, a lateral conveyor is located within a trough in the silage bed beneath the level of the rotating cutter arm, and serves to convey the silage through the openings in the silo wall to the exterior.

The present invention is directed to a silo unloader of the latter type and utilizes an endless chain conveyor having a series of paddles or blades to convey the silage from the center to the exterior of the silo. The conveyor chain is trained around a drive sprocket secured to a central drive shaft and around an idler sprocket located at the outer end of the conveyor, adjacent the silo wall. In addition to the conveyor chain, a rotatable paddle is secured to the idler sprocket. The idler sprocket shaft extends downwardly from the conveyor along the silo wall and the paddle rotates in a horizontal plane to dig a hole within the silage bed and eject the silage through the doors in the silo wall to the discharge chute.

In operation, the cutter arm rotates within the silo to cut and dislodge the silage and move the silage toward the center of the silo where it falls into the radial trough and it is conveyed laterally by the chain conveyor to the silo wall. The paddle digger is driven by movement of the conveyor chain and acts to dig a vertical hole adjacent the silo wall. Because of the speed at which the chain conveyor is operating, the silage will be thrown outwardly by the conveyor through the openings in the silo wall into the discharge chute. However, when the chain conveyor is in horizontal alignment with one of the frames between the openings in the silo wall, the silage thrown outwardly by the conveyor will strike and be deflected by the horizontal frame rather than being discharged to the exterior. In this situation, the silage deflected by the horizontal frame will fall downwardly with the hole dug by the digger paddle and will be discharged through the opening in the silo wall by the digger paddle. The paddle digger acts not only to dig a hole in the silage bed and discharge the silage which it digs, but also discharges silage which falls into the hole.

The present structure provides a simple and efficient device for unloading silage from the silo. A single power source is employed acting through a vertical shaft at the center of the silo. The digger paddle is directly connected to the idler sprocket of the conveyor chain and is rotated with the conveyor chain to discharge the silage.

Other objects and advantages will appear in the course of the following description.

The drawings illustrate the best mode presently contemplated of carrying out the invention.

Figure 2:
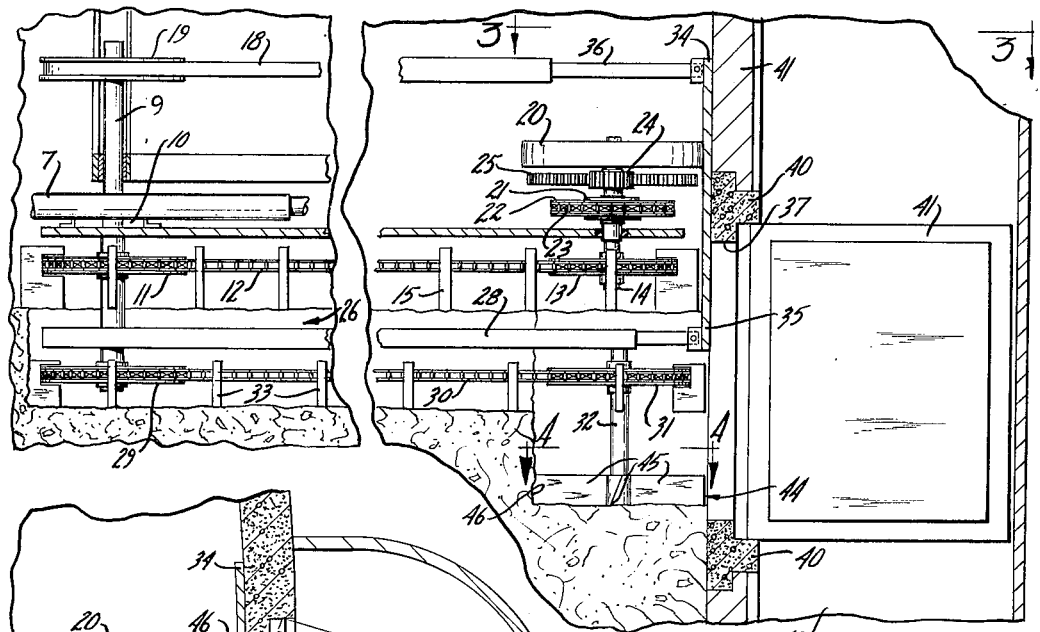
Figure 3:
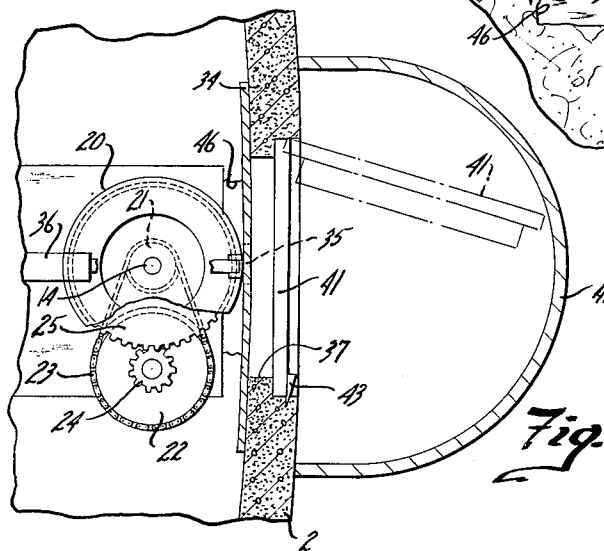
Figure 4:
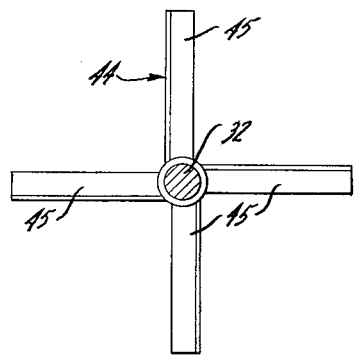

In the drawings:
FIG. 1 is a perspective view of the silo unloader located in a silo with parts broken away in section;
FIG. 2 is a vertical section taken through the silo wall, with parts broken away, and showing the cutter arm and conveyor in vertical alignment;
FIG. 3 is a horizontal section taken on line 3—3 of FIG. 2; and
FIG. 4 is a horizontal section taken on line 4—4 of FIG. 2.

The drawings illustrate a silo unloader 1 located in a silo 2 and adapted to dislodge and remove silage from a bed 3. The silo unloader shown in the drawings is similar to that shown in the United States Patent 3,071,263 to Bruecker, and includes a stationary frame 4 which is located at the center of the silo and is suspended from a cable 5. The cable 5 passes upwardly over a pulley, not shown, supported at the central portion of a tripod support mounted on the upper edge of the silo. The cable, after passing over the pulley, extends radially to the silo wall and then downwardly along the outer surface of the silo wall to a suitable winch or other device which can be used to raise and lower the unloader. The mechanism for supporting the unloader is conventional and, in itself, forms no part of the invention.

A cutter arm 6 is journalled on the frame 4 and is adapted to rotate within the silo. The cutter arm 6 includes a pair of generally parallel tubular members 7 which extend diametrically across the silo, and the tubular members 7 are connected by cover plate 8. A vertical drive shaft 9 is located approximately at the center of the silo and is journalled within a bearing assembly 10 mounted on plate 8 between the tubular members 7.

The silage is dislodged by a cutter chain assembly carried by the rotating cutter arm 6. A drive sprocket 11 is secured to drive shaft 9 and an endless chain 12 is trained around sprocket 11 and an idler sprocket 13 which is secured to a shaft 14 journalled in the outer end of the cutter arm plate 8. The chain 12 carries a series of spaced blades or knives 15 which travel with the chain and serve to dislodge the silage from the top of the bed 3 and move the dislodged silage toward the center of the silo.

The endless chain 12 is driven by a motor 16 which is mounted on the frame 4. The motor drive shaft 17 is connected by a belt 18 to a pulley 19 secured to the drive shaft 9. Operation of the motor acts through the belt drive 18 to rotate the vertical shaft 9 and thereby drive the chain 12 in an endless path to cut and dislodge the silage.

The cutter arm 8 is rotated within the silo by a drive wheel 20 which is mounted on the end of the cutter arm 6 and rides against the inner wall of the silo. To drive the wheel 20, a sprocket 21 is connected to shaft 14 and drives a sprocket 22 through a chain 23. A gear 24 is secured to the sprocket 22 and rotates with the sprocket 22. Gear 24 serves to drive a large gear 25 connected to the drive wheel 20. Both the gear 25 and the drive wheel 20 are secured together and are journalled on the shaft 14. With this construction, the rotation of the sprocket shaft 14 is transmitted to wheel 20 to rotate the cutter arm 6 within the silo 1.

The silage which has been dislodged and brought to the center of the silo by the cutter arm 6 is discharged to the exterior by a lateral conveyor 26 which is located within a radially extending trough 27 in the upper surface of the silage bed 3. The conveyor 26 includes a frame 28, and a drive sprocket 29 is secured to the vertical drive shaft 9 and is connected by chain 30 to an outer idler sprocket 31 which is secured to a vertical shaft 32 journalled in the outer end of frame 28. A series of paddles 33 are secured in spaced relation to the endless chain 30, and as the chain travels in its endless path, the paddles 33 serve to move the silage within trough 27 from the center of the silo toward the silo wall.

As best shown in FIG. 1, a curved plate 34 having a curvature corresponding to that of the silo wall, is provided with a downwardly extending tongue 35 which is secured to the outer end of the frame 28. The upper end of plate 34 is connected to brace 36 of frame 4. The curved plate 35 is located in alignment with the conveyor 26 and is adapted to bridge or span the openings 37 in the silo wall and permit the drive wheel 20 to ride across the openings as the cutter arm 6 rotates within the silo.

To prevent rotation of the frame 4 within the silo, a cable 38 is secured to the brace 36 and a torque arm 39 is slidably mounted on the cable. The outer end of the torque arm is adapted to engage the spacers 40 which separate the openings 37 in the silo wall. The torque arm 39, by being connected to a fixed object, prevents rotation of the frame 4 during operation of the unloader.

As best shown in FIGS. 1 and 2, the openings 37 in the silo wall extend vertically throughout the height of the silo and are separated by the horizontal frames or spacers 40. The openings 37 are adapted to be closed off by a series of doors 41, which are hinged to the silo wall and can be opened as desired to permit the silage to be discharged through the openings 37 into the exterior chute 42 which extends vertically along the outer wall of the silo. The doors 41 are held in the closed position by suitable locking members, indicated in FIG. 3 to be a series of wedges 43 which are driven into grooves in the silo wall bordering the opening 37.

To aid in discharging the silage into the chute 42, the vertical sprocket shaft 32 carries a digger paddle 44 which is located beneath the level of the conveyor 26. The paddle 44 includes a series of radially extending blades 45, and the blades are adapted to rotate in a horizontal plane to dig a vertical hole 46 in the silage bed 3 adjacent the openings 37. The rotation of the blades 45 cuts and dislodges silage from the bed, and also throws the silage outwardly into the chute 43 where it drops downwardly into a wagon or other conveying mechanism.

As best shown in FIG. 2, each blade 45 is tilted with respect to the vertical so that the lower edge is inclined in the direction of rotation. In addition, the lower edge of each blade is provided with a beveled or knife edge which aids in digging the vertical hole in the silage bed.

In operation of the unloader, the cutter arm 6 rotates within the silo and the cutter chain 12 moves in an endless path so that the blades 15 cut and dislodge the silage and move it toward the center of the silo where it is deposited in the trough 27 containing the conveyor 26. As the unloader operates, the conveyor chain 30 acts to dig the trough 27 in which it operates and the paddles 33 on the conveyor 26 then move the slidage radially outwardly toward the exterior of the silo. The speed of operation of the conveyor chain 30 is such that the paddles will throw the silage outwardly through the openings 37 into the chute 42. In addition, the digger paddle 44 rotates with the movement of the conveyor chain 30 and serves to dig the hole 46 in the silage bed as well as ejecting any silage which builds up in the area of the silo wall.

As the silage is removed from the upper surface of the bed 3, the doors 41 are progressively opened so that the opening 37 at the horizontal level of the conveyor 26 will be unobstructed. At various times during the unloading of the silo, the conveyor 26 will be in horizontal alignment with one of the frames 40, rather than an opening 37, and silage thrown outwardly by the chain conveyor will strike the frame 40 and be deflected downwardly into the hole dug by the digger paddle 44. As the digger paddle is positioned beneath the level of the conveyor 26, and thus beneath the frame 40, rotation of the digger paddle will throw the silage outwardly through the opening 37 into chute 42. The vertical spacing between the conveyor 26 and digger paddle 44 is greater than the vertical height of the frames 40, so that if the conveyor is in alignment with one of the frames 40, the digger paddle will be located beneath the frame in a position to eject silage through the opening 37.

The invention provides an improved silo unloader having a simple, yet efficient, drive mechanism. The rotating cutter arm 6, the chain conveyor 30 and the digger paddle 44, are all operated from the same power source, and both the drive wheel 20 and the digger paddle 44 are operated from the driven sprockets of the respective conveyor chains. This drive system eliminates the use of gear boxes and other gear trains which are conventionally employed in silo unloaders of this type.

Various modes of carrying out the invention are contemplated as being within the scope of the following claims particularly pointing out and distinctly claiming the subject matter which is regarded as the invention.

I claim:

1. A silo unloader for use in a silo having a series of discharge openings in the side wall thereof separated by a series of generally horizontal structural members, comprising a frame supported in the silo above the silage bed, a cutter arm mounted for rotation on the frame and adapted to rotate within the silo to dislodge and move the silage toward the center of the silo, a lateral conveyor mounted beneath the level of the cutter arm and disposed to convey silage from the center of the silo through the discharge openings in the silo wall to the exterior, said lateral conveyor comprising an endless chain having a series of silage conveying members mounted thereon to move the silage outwardly and including a chain supporting sprocket located adjacent the silo wall and mounted on a vertical shaft, and a paddle secured to said vertical shaft adjacent the silo wall and located at a level beneath that of the lateral conveyor, said paddle having a series of blades disposed to rotate in a horizontal plane to dig a hole in the silage bed adjacent the wall and discharge silage laterally through the openings in the wall.

2. The structure of claim 1 in which the blades extend radially from the vertical shaft and are inclined to the vertical.

3. A silo unloader for use in a silo having a series of discharge openings in the side wall thereof separated by a series of generally horizontal structural members, comprising a frame supported in the silo above the silage bed, a cutter arm mounted for rotation on the frame and adapted to rotate within the silo to dislodge and move the silage toward the center of the silo, a vertical drive shaft mounted for rotation at the center of the frame, cutter arm means secured to said drive shaft and rotatable within the silo to dislodge silage and move it toward the center of the silo, a lateral conveyor extending radially from the center of the silo to the silo wall and located at a level beneath said cutter arm means, said lateral conveyor including a first sprocket secured to said vertical drive shaft and including a second sprocket located adjacent the silo wall and secured to a second vertical shaft, said lateral conveyor also including an endless chain connecting the sprockets together and having a series of paddles attached to the chain for moving silage outwardly and discharging the silage through the openings in the silo wall, and a paddle secured to the lower end portion of said second vertical shaft and mounted at a level beneath said lateral conveyor, said paddle including a series of blades disposed to rotate in a horizontal plane to dig a hole adjacent the silo wall and discharge the silage laterally through the openings in the wall to the exterior.

4. The structure of claim 3, in which the blades on the paddle extend radially from the second vertical shaft and the lower edges of the blades are inclined in the direction of rotation of said blades.

References Cited by the Examiner
UNITED STATES PATENTS

| | | | |
|---|---|---|---|
| 3,045,841 | 7/1962 | Skromme | 214—17 |
| 3,063,581 | 11/1962 | Bruecker | 214—17 |

HUGO O. SCHULZ, *Primary Examiner.*